(12) United States Patent
Smith

(10) Patent No.: US 9,198,405 B2
(45) Date of Patent: *Dec. 1, 2015

(54) SYSTEMS AND METHODS FOR BOAT ANESTHETIZATION OF FISH

(75) Inventor: Kerry Douglas Smith, La Center, WA (US)

(73) Assignee: Smith-Root, Inc., Vancouver, WA (US)

( * ) Notice: Subject to any disclaimer, the term of this patent is extended or adjusted under 35 U.S.C. 154(b) by 666 days.

This patent is subject to a terminal disclaimer.

(21) Appl. No.: 13/342,033

(22) Filed: Jan. 1, 2012

(65) Prior Publication Data

US 2013/0008385 A1  Jan. 10, 2013

Related U.S. Application Data

(62) Division of application No. 12/757,386, filed on Apr. 9, 2010, now Pat. No. 8,087,384.

(60) Provisional application No. 61/168,476, filed on Apr. 10, 2009.

(51) Int. Cl.
*A01K 61/00* (2006.01)
*A01K 79/02* (2006.01)
*A01K 97/20* (2006.01)

(52) U.S. Cl.
CPC ............... *A01K 79/02* (2013.01); *A01K 97/20* (2013.01)

(58) Field of Classification Search
CPC ............................ A01K 79/02; A01K 97/20

USPC ......... 119/200, 201, 202, 215, 220, 228, 245, 119/246, 247, 248; 43/4.5, 17.1, 55, 98; 452/59

See application file for complete search history.

(56) References Cited

U.S. PATENT DOCUMENTS

| | | | | |
|---|---|---|---|---|
| 3,450,130 A | * | 6/1969 | Runge | 600/529 |
| 4,012,686 A | * | 3/1977 | Heine | 323/273 |
| 4,750,451 A | * | 6/1988 | Smith | 119/220 |
| 4,825,810 A | * | 5/1989 | Sharber | 119/220 |
| 5,305,711 A | * | 4/1994 | Sharber | 119/215 |
| 5,327,854 A | * | 7/1994 | Smith et al. | 119/220 |
| 5,406,740 A | * | 4/1995 | Wilkin | 43/56 |
| 5,551,377 A | * | 9/1996 | Sharber | 119/220 |
| 6,132,303 A | * | 10/2000 | Buckhaven | 452/59 |
| 2010/0107986 A1 | * | 5/2010 | Holliman et al. | 119/220 |
| 2010/0313820 A1 | * | 12/2010 | Holliman | 119/220 |
| 2013/0042516 A1 | * | 2/2013 | Lehman | 43/4.5 |

* cited by examiner

*Primary Examiner* — Kristen C Hayes
*Assistant Examiner* — Ebony Evans
(74) *Attorney, Agent, or Firm* — J. Curtis Edmondson; Law Offices of J. Curtis Edmondson

(57) ABSTRACT

A boat holding tank for anesthetizing fish is described having a pulsator, with the pulsator having an anode output and a cathode output; a holding tank capable of receiving an aquatic animal, the holding tank further comprising an anode probe and a cathode probe, with the anode cathode probe of the holding tank switchably connected to the anode and cathode output of the pulsator, such that when the pulsator is activated the aquatic animal in the holding tank is anesthetized.

8 Claims, 5 Drawing Sheets

SYSTEMS AND METHODS FOR BOAT ANESTHETIZATION OF FISH

RELATED APPLICATIONS

This application is a divisional of application Ser. No. 12/757,386 filed Apr. 9, 2010 now U.S. Pat. No. 8,087,384, and also claims the benefit of U.S. Provisional Application No. 61/168,476, filed on Apr. 10, 2009, the contents herein incorporated into this application by reference.

BACKGROUND

The present inventive subject matter relates to holding tanks for the stunning and/or euthanization of fish using electric currents on boats.

The effect of electric currents on fish are well known in the prior art and especially in the general techniques of electrofishing. Electrofishing involves the use of electric currents to attract and/or repel fish with the intent of creating aquatic barriers, sample fish barriers, and/or to increase collection yields.

It has been established that relatively small potentials that are impressed across the body of a fish invoke a flight reaction. Larger potentials result in the alignment of the fish with the electric current, or electrotaxis. Still larger potentials may result in unconsciousness or complete euthanasia of the fish. (See Introduction to Electrofishing, pages 24-26, Smith-Root, Inc. which is incorporated herein by reference as Exhibit A).

Electrofishing has traditionally been used in freshwater lakes and streams and is the subject of U.S. Pat. Nos. 5,445,111; 5,327,854; 4,750,451; 4,672,967; 4,713,315; 5,111,379; 5,233,782; 5,270,912; 5,305,711; 5,311,694; 5,327,668; 5,341,764; 5,551,377; and 6,978,734 which are incorporated herein by reference.

A recurring problem with the examination of laboratory fish is that they tend to be very active. The small size of the fish combined with their activity can impair the researcher from making precise scientific measurements unless the fish is caught and inspected. Thus direct examination of fishes is preferred to "in situ" measurements.

An aspect of fish conservation involves the collection, tagging, and then the subsequent release of tagged fish. If the tagged fish is then captured at a later date, the difference in the fishes' location, health, and size can be compared to when the fish was first caught. Alternately, a group of fish may be caught from a particular area to determine the statistical distribution of each of the fish species. Furthermore, fishes may be caught to determine if a fish is from wild stock or from fishery stock. In all of these cases, when the fish are captured they are typically placed in a holding tank on the boat, and then they are inspected for species and/or tag information, and then returned to the water. When the fish is on the boat it may be in an excited or agitated state due to having been just caught. The agitated state of the fish will typically make it difficult for fish scientists to handle the fish. An agitated fish in the holding tank may also injure other fishes in the same tank. The scientists may also have to accommodate inclement weather conditions on the boat that may include pitching and rolling of the deck.

What is desired is a safe way to anesthetizing fish in the holding tank of a boat as to reduce the amount of stress on the fish while they are inspected and handled. Prior art solutions and techniques to induce anesthesia in fish involve the addition of chemicals to the tank. See U.S. Pat. Nos. 3,551,566; 3,644,625; and 4,807,615; which are incorporated by reference. Chemicals used for anesthesia are expensive to acquire, pose a storage and maintenance problem, and are at risk of degradation. Also the rocking motion of the boat makes dispensing the chemicals into the boat holding tank a difficult process.

Furthermore, there may be environmental restrictions on the discharge of the holding tank contents once a chemical anesthetic in introduced into the holding tank water. If there are restrictions on the discharge of water, this requires that the holding tank water be stored and removed upon the return to dock. The process of storing holding tank water increases the operational cost of the boat due to the increased energy costs.

Therefore, what is desired is an apparatus to immobilize fish and place the fish in an anesthesia state while in a holding tank in the boat. It is also desired that the apparatus pose little or no attendant risk to the researchers or fisherman whom are close to the holding tank. It is also desired that this apparatus can operate without significant modification to the boat infrastructure. It is also desired that this apparatus operate without the use of chemical additives.

SUMMARY

The present inventive subject matter overcomes problems in the prior art by providing a boat holding tank for anesthetizing fish with a pulsator, the pulsator having an anode output and a cathode output; a holding tank capable of receiving an aquatic animal, the holding tank further comprising an anode probe and a cathode probe, the anode probe switchably connected to the anode output and the cathode probe switchably connected to the cathode output; such that when the pulsator is activated and the anode and cathode outputs from the pulsator are switchably connected to the anode and cathode probes in the holding tank, the aquatic animal is anesthetized. Also described is a boat holding tank for anesthetizing fish has a voltage waveform that is direct current. The boat holding tank for anesthetizing fish that has the voltage waveform is alternating current. Also described is a boat holding tank for anesthetizing fish that has the voltage waveform is pulsed direct current. Also described is a boat holding tank for anesthetizing fish that has the pulsator with an electrofishing anode and cathode, the electrofishing anode and cathode capable of being electrically connected to a pulsator anode and cathode; and having a control input, a control input capable of selecting the electrical path of the anode output and cathode, such that when the control input is activated, the anode and cathode probe pair are connected to the anode and cathode probes in the holding tank, and such that when the control input is not activated, the anode and cathode probe pair are connected to the electrofishing anode and cathode. Also described is a boat holding tank for anesthetizing fish as having a pulsator that creates a potential difference between the first electrode and the second electrode creates where the potential difference induces euthanasia in an aquatic animal. Also described is a boat holding tank for anesthetizing fish as where the pulsator has: a pressure mat, the pressure mat proximate to the boat holding tank, an electrical switch, and the electrical switch is activated when a person steps on the pressure mat; such that when the electrical switch is activated, the pulsator is deactivated.

The present inventive subject matter includes a method for inducing electroanesthesia in aquatic animals located in a boat holding tank, the method having the steps of connecting an anode output and a cathode output from the pulsator to the anode probe and the cathode probe in the holding tank; energizing the pulsator for a time period, the energization of the pulsator creating a potential difference between the anode probe and the cathode probe; such that the time period ends when the aquatic animal is anesthetized. Also described is a method for inducing electroanesthesia so that the potential difference between the anode probe and the cathode probe is an alternating current waveform. Also described is a method for inducing electroanesthesia so that the potential difference between the anode probe and the cathode probe is a direct current waveform. Also described is a method for inducing electroanesthesia so that the potential difference between the anode probe and the cathode probe is a pulsed direct current waveform. Also described is a method for inducing electroanesthesia which includes the steps of disabling the pulsator if a person is on a pressure mat proximate to the holding tank. Also described is a method for inducing electroanesthesia which includes the steps of disabling the pulsator if a person is on a pressure mat proximate to the holding tank. Also described is a method for inducing electroanesthesia which includes the steps of selecting the anode and cathode output from the pulsator to be directed to the electrofisher anode and cathode.

These and other embodiments are described in more detail in the following detailed descriptions and the figures.

The foregoing is not intended to be an exhaustive list of embodiments and features of the present inventive subject matter. Persons skilled in the art are capable of appreciating other embodiments and features from the following detailed description in conjunction with the drawings.

LIST OF REFERENCE CHARACTERS

Figure 1:
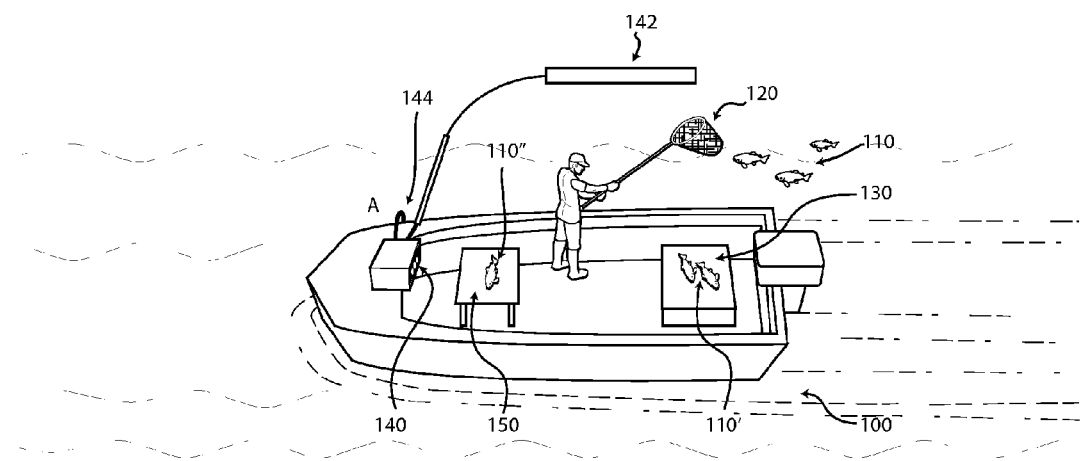
FIG. 1 is a top view diagram of a eletrofishing boat with a holding tank, an examination table, and electrofishing equipment.

100—Prior Art Electrofishing Boat
110, 110', 110"—Fish
120—Net
130—Holding Tank
140—Pulsator
142—Electrofishing Cathode
144—Electrofishing Anode
150—Inspection Table
210—Boat Deck
242—Electroanethesia (EA) Cathode Electrode
244—Electroanesthesia (EA) Anode Electrode
300—Pulsator Switch System Diagram
310—DPDT Switch
320—DPDT Switch Control
330—Control Input
400—Pulsator Output Flowchart
410—Start
420—Check if electroanesthesia switch is on.
430—Select electroanesthia power setting
440—Select Electrofishing Power Setting 510—Pressure Mat
520—Pressure Mat Output
530—Hand

DETAILED DESCRIPTION

Representative embodiments according to the inventive subject matter are shown in FIGS. 1-5 wherein similar features share common reference numerals.

The term "fish" refers to fish as typically caught by research vessels in saltwater and freshwater environments, but, is not limited to a particular species. The term "fish" should also include the class of mammals that live or frequent waters, for example, seals, dolphins, manatees, and/or pinnipeds.

The term "holding tank" is generally a 30-200 gallon tank that is used by researchers and is customarily bolted to or set on the deck of a boat. Holding tanks can also be larger or smaller (e.g. aquarium size tanks). Holding tanks will generally be found on the deck of the boat, but may also be below the deck of the boat.

The term "pulsator" refers to an electrical apparatus, generally an electrical generator used for electrofishing and/or electroanesthesia. Such devices include products manufactured by Smith-Root, Inc. (Vancouver, Wash., USA), with representative models being the Type VI-A Electrofisher (the users manual incorporated herein by reference and attached as Appendix A) and the Portable Electoanesthesia System (PES).

Now referring to FIG. 1, which depicts a prior art electrofishing boat 100 that is located in the water proximate to fish 110. The operator on the electrofishing boat 100 uses a net 120 to capture fish 110 in the water. The fish 110' are then transported into the holding tank 130 for further examination on a table 150, typically for research purposes. To aid in attracting fish fish 110 to an area proximate to the net 120, the operator of the electrofishing boat 100 will energize a pulsator 140, which creates a potential between the cathode 142 and the anode 144. The potential difference between the cathode 142 and the anode 144 creates a current flow between the cathode 142 and the anode 144. The current flow creates a potential difference across the body of a fish located within the field between the cathode 142 and the anode 144. The size of the voltage gradient induced in the fish will determine the effect on the fish with the ideal effect being electrotaxis. The effect of electrotaxis on the fish results in the fish being attracted to the cathode, where they are netted.

The pulsator 140 can be modified to generate a potential difference (e.g. a voltage) which has a steady direct current output, an alternating current output, or a pulsed direct current output. The pulsed direct current output will typically have a duty cycle variation from 0.1% to 50%, but typically a value of 1% is utilized.

Furthermore, a stream of water can be injected into the tank to orient the fish along an axis that optimizes the potential difference across the body of the fish.

Figure 2:
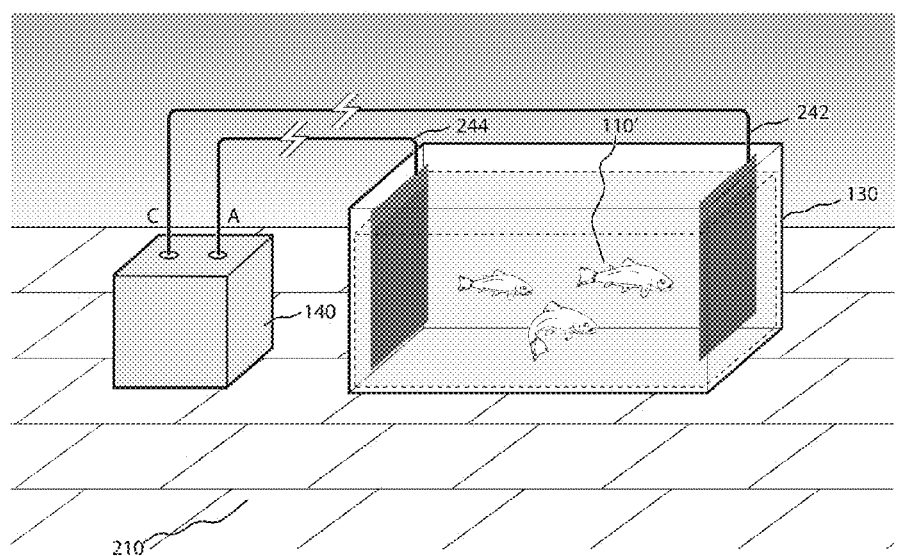
FIG. 2 is a close up view of the improved holding tank incorporating an anode and cathode leads connected to the pulsator.

Now referring to the holding tank 130, as shown in FIG. 2, the holding tank 130 has a electroanesthesia (EA) cathode electrode 242 and an electroanesthesia (EA) anode electrode 244 placed at opposite ends of the holding tank 130 so that fish 110' are in between the two electrodes. The EA cathode electrode 242 and the EA anode electrode 244 are connected to the pulsator 140. The pulsator 140 creates an electrical field between the EA cathode electrode 242 and the EA anode electrode 244. The holding tank 130 is typically position on the boat deck 210, but, may also be located in other areas of the boat.

To induce electrotaxis a voltage gradient of approximately 1.5 V/cm should be induced across the body of the fish. To anesthetize the fish 160, (electronarcosis), a voltage gradient of 150-250 V/m (1.5 to 2.5 V/cm) should be induced across the body of the fish 160. To induce paralysis in the fish (tetany) a greater voltage gradient is needed than electronarcosis. To euthanize the fish 160, a voltage gradient of 5.0 V/cm or greater should be induced across the body of the fish 160. The voltage gradients needed for electronarcosis, tetany, and euthanasia vary from fish species to fish species, and of course, differ based on the individual physiology of each fish. Furthermore, the effect on the fish is dependent on the amount of time the fish is exposed to the potential difference.

Figure 3:
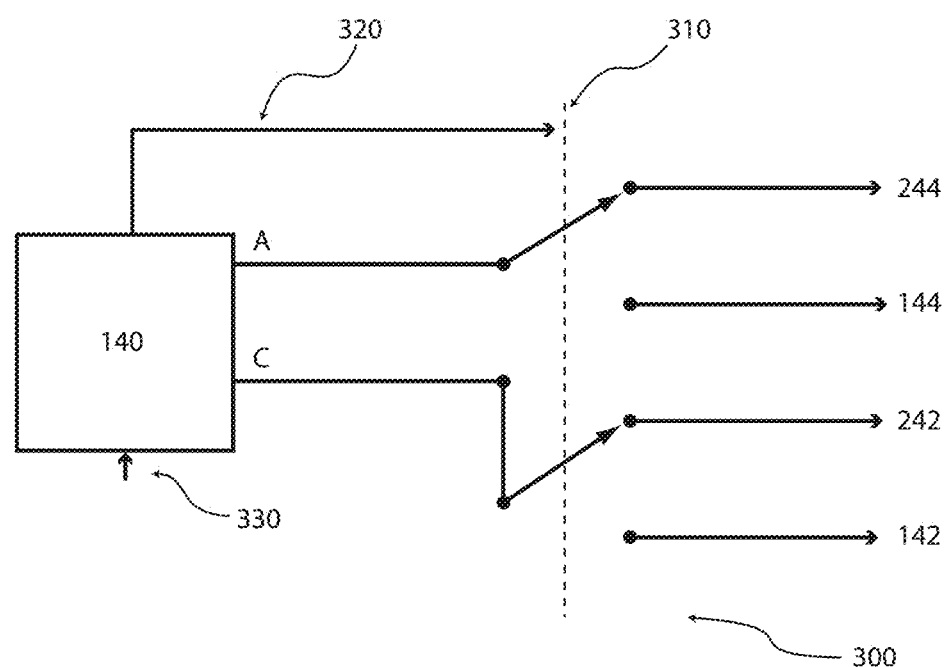
FIG. 3 is a systems diagram of the pulsator switch between the electrofishing anode and cathode, and the electroanesthesia anode and cathode.

Referring to FIG. 3 which shows the pulsator switch system diagram 300, a single pulsator 140 is depicted with a control input 330, and a dpdt (double pole, double throw) switch 310. The switch 310 is controlled by the dpdt switch controller 320 connected to the pulsator 140 in response to the control input 330. In one setting the switch 310 connects the cathode output of the pulsator 140 to the EA cathode electrode 242 and the anode output of the pulsator 140 to the EA anode electrode 244. In the other setting the switch 310 connects the cathode output of the pulsator 140 to the electrofishing cathode 142 and the anode output of the pulsator 140 to the electrofishing anode 144.

When the pulsator 140 is connected to the anode and cathode placed in the holding tank 130 and energized, the fish 110' in the holding tank 130 are anesthisized. The process of anesthetization effectively renders the fish motionless without killing the fish. In this state, they may be transported to the inspection table 150, examined, and returned to the holding tank. The use of an electrical current for anesthesia on the fish 110' is functionally equivalent to the use of chemical anesthetic agents without the attendant drawbacks of the use of the chemical method.

Figure 4:
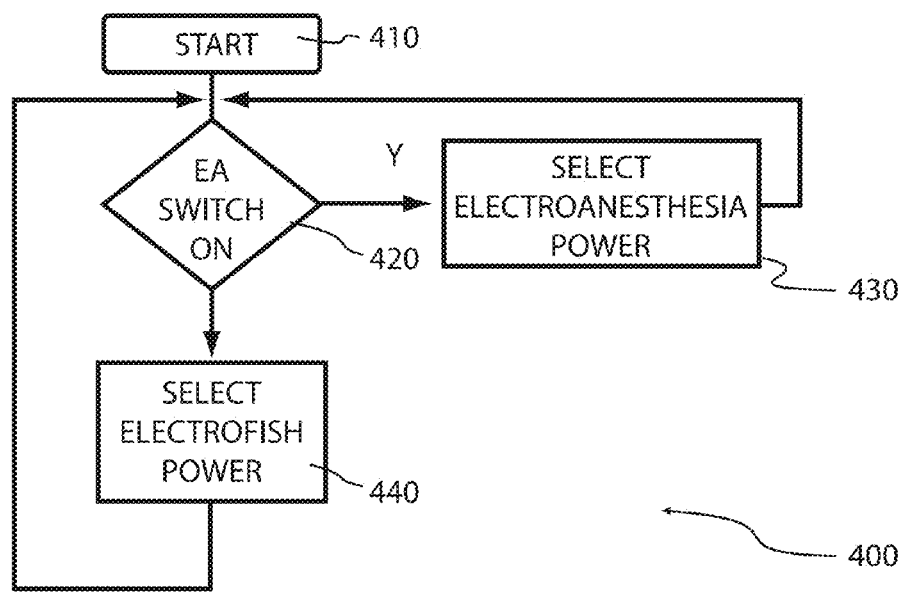
FIG. 4 is flowchart for the switching power between the electrofishing anode and cathode and the electroanesthesia anode and cathode.

With continuing reference to FIGS. 2 and 3, and referring to the flowchart 400 of the operation of the pulsator 140 in response to the control switch 310 as shown in FIG. 4, the pulsator 140 checks to see if the electroanesthesia control input 330 is set 430 to direct the pulsator power to the electroanesthesia anode and cathode pair. If the electroanesthesia control input 330 is not set, then the pulsator power will be directed to the electrofishing anode and cathode pair. The pulsator 140 operates by starting 410 the testing if the switch 310 is in the on 420 position, the electroanesthesia power is selected 430, otherwise the electrofishing power is selected 440.

Figure 5:
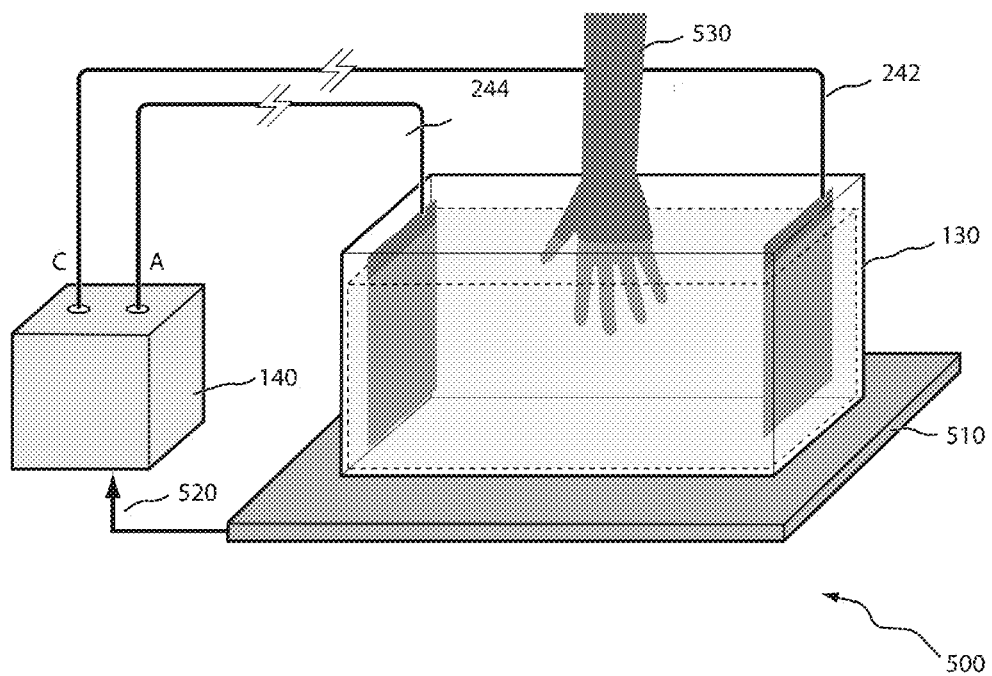
FIG. 5 is a view of the holding tank with a switch mat surrounding the holding tank.

Now referring to FIG. 5 which shows another embodiment 500 with the holding tank 130, the pulsator 140, and a pressure mat 510 surrounding the holding tank 130. When current is flowing between the cathode 242 and the anode 244, there exists an opportunity for a person to place their hand 530 or other appendage into the holding tank 130 and thus exposing the hand 530 to the electric field between the cathode 242 and the anode 244. To prevent this exposure, the pressure mat 510 contains an electrical switch 520 that is closed when a person steps on the map. When the switch 520 is closed an electrical signal is input into the pulsator 140 which deactivates the pulsator 140. The objective being that the pulsator 140 is disabled when a hand 530 or other appendage is in the vicinity of the holding tank 130.

The holding tank 130 can be made of an insulating material, such as plastic, fiberglass, composite resins, and/or other polymers. Also a typical metallic holding tank, such as aluminum can be coated with a plastic to insulate the tank. The tank can also have various attachments, such as, water recirculators and air bubblers to adjust and improve the environment for the aquatic species being anesthetisized.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

The invention claimed is:

1. A boat holding tank for anesthetizing fish comprising:
  a pulsator, the pulsator having an anode output and a cathode output;
  a holding tank configured to receive and retain fish and proximately mounted to the boat, the holding tank further comprising:
    an anode electrode and a cathode electrode, the anode electrode switchably connected to the anode output of the pulsator and the cathode electrode switchably connected to the cathode output of the pulsator;
  a potential difference created between the anode and cathode outputs when the pulsator is energized while fish are held in the holding tank, the potential difference is at least one of direct current, alternating current, and pulsed direct current;
  the pulsator further comprising:
    an electrofishing anode and cathode, the electrofishing anode and cathode capable of being electrically connected to the pulsator anode and cathode outputs; and
    a control input capable of selecting an electrical path of the anode and cathode outputs,
  wherein when the control input is activated, the anode and cathode outputs are connected to the anode and cathode electrodes in the holding tank, and
  wherein when the control input is not activated, the anode and cathode outputs are connected to the electrofishing anode and cathode.

2. A boat holding tank for anesthetizing fish comprising:
  a pulsator, the pulsator having an anode output and a cathode output;
  a holding tank configured to receive and retain fish and proximately mounted to the boat, the holding tank further comprising:
    an anode electrode and a cathode electrode, the anode electrode switchably connected to the anode output of the pulsator and the cathode electrode switchably connected to the cathode output of the pulsator;
  a potential difference created between the anode and cathode outputs when the pulsator is energized while fish are held in the holding tank, the potential difference is at least one of direct current, alternating current, and pulsed direct current;
  the pulsator further comprising:
    an electrofishing anode and cathode, the electrofishing anode and cathode capable of being electrically connected to the pulsator anode and cathode outputs;
    a control input capable of selecting an electrical path of the anode and cathode outputs,
  wherein when the control input is activated, the anode and cathode outputs are connected to the anode and cathode electrodes in the holding tank, and
  wherein when the control input is not activated, the anode and cathode outputs are connected to the electrofishing anode and cathode;

a pressure mat, the pressure mat proximate to the holding tank; and an electrical switch, the electrical switch being activated when a person steps on the pressure mat, wherein when the electrical switch is activated, the pulsator is disabled.

3. A method for inducing electroanesthesia in aquatic animals located in a boat holding tank, the method comprising:

connecting an anode output and a cathode output from a pulsator to an anode electrode and a cathode electrode in the holding tank;

energizing the pulsator for a time period, the energization of the pulsator creating a potential difference between the anode electrode and the cathode electrode, wherein the time period ends when the aquatic animal is anesthetized;

wherein the potential difference is at least one of direct current waveform, alternating current waveform, and pulsed direct current waveform;

disabling the pulsator if a person is on a pressure mat proximate to the holding tank; and selecting the anode output and the cathode output from the pulsator to be directed to an electrofisher anode and cathode.

4. A system for the electrification of water in a holding tank to induce electroanesthesia in aquatic animals comprising:

an electric generator, the electric generator having a setting for anesthetizing aquatic animals in the holding tank on a boat;

an electroanesthesia cathode electrode and an electroanesthesia anode electrode;

an electrofishing anode and an electrofishing cathode;

means for selecting the setting of the electric generator wherein when the aquatic animal is in the holding tank, the electric generator creates a potential difference between the electroanesthesia cathode electrode and the electroanesthesia anode electrode; such that the potential difference induces anesthesia in the aquatic animal.

5. The system for the electrification of water in a holding tank as in claim 4, wherein the potential difference is an alternating current.

6. The system for the electrification of water in a holding tank as in claim 4, wherein the potential difference is a pulsed direct current.

7. The system for the electrification of water in a holding tank as in claim 4, wherein the potential difference is a direct current.

8. The system for the electrification of water in a holding tank as in claim 4, further comprising:

a pressure mat, the pressure mat having a means for disabling the potential difference when a person steps on the pressure mat.

\* \* \* \* \*